US012161983B2

(12) United States Patent
Getrum et al.

(10) Patent No.: US 12,161,983 B2
(45) Date of Patent: Dec. 10, 2024

(54) MIXER WITH SINGLE-USE LINER CONVERSION TO TOP-MIX OPERATION

(71) Applicants: Jeffrey O. Getrum, Fort Worth, TX (US); James A. Austin, Fort Worth, TX (US)

(72) Inventors: Jeffrey O. Getrum, Fort Worth, TX (US); James A. Austin, Fort Worth, TX (US)

(73) Assignee: ConeCraft, Inc., Fort Worth, TX (US)

( * ) Notice: Subject to any disclaimer, the term of this patent is extended or adjusted under 35 U.S.C. 154(b) by 647 days.

(21) Appl. No.: 17/482,590

(22) Filed: Sep. 23, 2021

(65) Prior Publication Data

US 2023/0093509 A1 Mar. 23, 2023

(51) Int. Cl.

*B01F 33/453* (2022.01)
*B01F 35/30* (2022.01)
*B01F 35/511* (2022.01)
*B01F 101/22* (2022.01)

(52) U.S. Cl.

CPC .......... *B01F 33/453* (2022.01); *B01F 35/511* (2022.01); *B01F 2035/351* (2022.01); *B01F 2101/22* (2022.01)

(58) Field of Classification Search

CPC .... B65D 77/06; B65D 21/086; B65D 90/205; B65D 88/68; B65D 37/00; B65D 88/16; B65D 83/0055; A61J 1/05; B01F 15/0085; B01F 7/163; B01F 15/00831; B01F 7/162; B01F 2215/0032; B01F 13/0836; B01F 3/04531; B01F 7/00725; B01F 7/1695; B01F 3/04248; B01F 7/00716; B01F 7/22; B01F 7/00633; B01F 2215/0073; B01F 2003/04326; B01F 2003/04673; B01F 33/453; B01F 35/511; B01F 2035/351; B01F 2101/22; B01F 35/31; B01F 35/513; B01F 27/61; C12M 27/02; C12M 23/14; C12M 23/00; C12M 23/26

USPC ........ 366/273–274, 314, 348, 117, 118, 315, 366/317, 322–335; 435/302.1; 604/416, 604/903; 383/127; 416/3; 206/219–221, 206/818; 215/DIG. 3, DIG. 8

See application file for complete search history.

(56) References Cited

U.S. PATENT DOCUMENTS

| | | | | |
|---|---|---|---|---|
| 9,700,857 B1 * | 7/2017 | Larsen | ................ | B01F 35/3231 |
| 10,118,141 B2 * | 11/2018 | Larsen | ................ | B01F 35/4121 |
| 10,150,090 B2 * | 12/2018 | Goodwin | .............. | B01F 27/805 |
| 2005/0213428 A1 * | 9/2005 | Freude | .................... | B01F 33/85 366/273 |

(Continued)

FOREIGN PATENT DOCUMENTS

WO WO-2013040161 A1 * 3/2013 .......... B01F 13/0818

*Primary Examiner* — Charles Cooley

(74) *Attorney, Agent, or Firm* — Dan Brown Law Office; Daniel R. Brown

(57) ABSTRACT

A method and system for converting a single-use liner lined bottom-mix mixing vessel to a single-use liner lined top-mix missing vessel. A bottom mount magnetic impeller drive is replaced by a top mounted impeller drive. A support frame is placed on an upper portion of the mixing vessel and has an articulated joint supporting a motor drive assembly. A top-mix single-use liner is inserted into the mixing vessel. An impeller drive shaft is inserted through a rotary hub seal in the liner to drive an internal impeller. The rotary hub seal is located by a hub lock assembly attached to the motor drive assembly.

18 Claims, 10 Drawing Sheets

(56) References Cited

U.S. PATENT DOCUMENTS

2007/0253287 A1* 11/2007 Myhrberg ............. B01F 27/808
366/302
2013/0101982 A1* 4/2013 Goodwin ............... C12M 23/26
435/325
2016/0304824 A1* 10/2016 Mahajan ................ C12M 23/48
2018/0318781 A1* 11/2018 Jones ..................... C12M 29/06
2019/0054433 A1* 2/2019 Larsen .................. B01F 27/191
2023/0093509 A1* 3/2023 Getrum ................. B01F 33/453
366/241

* cited by examiner

80

MIXER WITH SINGLE-USE LINER CONVERSION TO TOP-MIX OPERATION

RELATED APPLICATIONS

None.

BACKGROUND OF THE INVENTION

Field of the Invention

The present invention relates to biopharmaceutical production mixing equipment. More particularly, the present invention relates to conversion of mixing equipment, which employ sterile single-use liners with internal mixing impellers, from bottom-mix operation to top-mix operation.

Description of the Related Art

The biopharmaceutical manufacturing industry relies on a wide range of processing equipment to produce an even wider range of products. A common application is the use of mixing equipment to blend fluids in production of chemicals, drugs, biologic compounds, vaccines, therapeutics, and other materials. Of course, avoidance of contamination, purity, cleanliness, and sterility, are essential in biopharmaceutical production. Such mixing equipment should also enhance production efficiency, control costs, reduce downtime, maintain quality and consistency, provide for operator safety, and generally improve production efficiency and quality. One technique that addresses these issues is the application of single use components, which are non-contaminating and sterile when deployed in production, and are then discarded and replaced when production changes dictate. In the case of mixing equipment, the use of sterile liners in carrier vessels has been employed together with single use fluid conduits of various types coupled to such mixing equipment.

An example of such mixing equipment includes a structural carrier, typically a vessel fabricated from stainless steel or polymeric materials, having a predetermined volumetric capacity, and which support a correspondingly sized polymeric film liner, sometimes referred to as a single use bag, that is inserted into the carrier vessel. Various ports and connectors may be manufactured integral with such bag liners, enabling operators to connect fill and drain conduits, sampling ports, instrumentation ports, and other fitments useful for production. Of course, the nature of mixing includes the requirement to blend and circulate fluids within the mixer to achieve a uniform blends of liquids, as well as the dissolution of gases and solids into liquid blends. This is commonly achieved using a motor driven impeller within the mixing vessel.

In order to deploy a mixing impeller inside a single use bag liner, which impeller is driven by a motor drive assembly, one approach is to provide a sterile magnetically driven impeller within the bag liner that operates in conjunction with a motor drive disposed exterior of the bag liner. The use of magnetically coupled impellers is known, and typically involves a motor drive unit having a rotating magnetic drive head that magnetically couples rotary power through magnetic drive coupler to a magnetic rotor fixed to the impeller. The boundary between the non-sterile magnetic drive head and the magnetic rotor unit is a cup-like fitment in a sterile single-use bag liner, which is then positioned within a magnetic drive port in the mixing vessel. As will be appreciated by those skilled in the art, the physical size and shape of the carrier vessel and its various fitments must be correspondingly addressed by the shape, configuration and fitments of the single use bag liner. In fact, often times these two components are provided from a single source. For this type of arrangement, the single use bag liner is fabricated and supplied with the magnetically driven impeller unit therein. In operation, the bag liner is inserted into the carrier vessel, the impeller unit is positioned into the drive port of the carrier vessel, and the motor drive attached to the exterior thereof for coupling of rotary power to the impeller. This arrangement is known to those skilled in the art as a magnetic drive bottom mixer because the impeller is generally disposed at the bottom of the carrier vessel, with its motor drive located below the carrier vessel.

The requirement for such equipment to enhance production efficiency and avoid down-time necessarily contemplates supply chain logistics. A purpose build carrier vessel and bottom mix drive unit are of little utility while the supply chain of single use bag liners is interrupted. Unfortunately, interrupted supply chain logistics has become a serious problem in recent years, and has even affected the availability of critical drugs and vaccines. This problem is exacerbated by the requirement to obtain single source components, such as the aforementioned purpose built single use bag liners. Thus, it can be appreciated that there is a need in the art to address these problems in the prior art.

SUMMARY OF THE INVENTION

The need in the art is addressed by the methods and systems of the present invention. The present disclosure teaches a method of converting a bottom-mix mixing vessel, which has a magnetic drive unit that engages a magnetic drive port located at a lower portion of the mixer, and that employs a bottom-mix single-use liner therein, to top-mix operation. The method includes altering the magnetic drive unit so that no portion thereof extends into the interior of the mixing vessel. Then, attaching a support frame, which has a first component of an articulated joint, to an upper portion of the mixing vessel, and attaching a motor drive assembly, that includes a second component of an articulated, to the support frame by engaging the first component with the second component, thusly assembling an articulated joint that supports the motor drive assembly. Then, inserting a top-mix single-use liner, which as a rotary hub seal about its upper portion, into the mixing vessel, and inserting an impeller shaft through the rotary hub seal and engaging its distal end to an impeller, which is located inside the top-mix single-use liner. The method further includes coupling a proximal end of the impeller shaft to a rotary output of the motor drive assembly, passing through a hub lock assembly attached to the motor drive assembly, and engaging the rotary hub seal with the hub lock assembly, thereby enabling the coupling of rotary power from the motor drive assembly, through the rotary hub seal, and to the impeller.

In a specific embodiment, the foregoing method further includes adjusting the articulated joint to position the impeller at a preferred mixing position within the top-mix single-use liner. In a refinement to this embodiment, where the first and second components of the articulated joint are a ball and socket with a position lock disposed therebetween, the method further includes locking the position lock after adjusting the position.

In a specific embodiment, the foregoing method further includes inserting a frame adapter between the upper portion of the top-mix mixing vessel and the support frame, thereby adapting the support frame to fit the top-mix mixing vessel.

In a specific embodiment, there foregoing method further includes inserting a motor drive support bracket between the second component of the articulated joint and motor drive assembly, thereby adjusting the position and clearance of the motor drive assembly with respect to the upper portion of the top-mix mixing-vessel.

In a specific embodiment, the foregoing method further includes inserting a means for lateral adjustment between the articulated joint and support frame, and adjusting the means for lateral adjustment for position and clearance of the motor drive assembly with respect to the upper portion of the top-mix mixing-vessel. In a refinement to this embodiment, the means for lateral adjustment are plural slots and attachment bolts disposed between the first component of an articulated joint and the support frame.

In a specific embodiment of the foregoing method, where the support frame includes a hinged frame portion and a fixed frame portion, the method further includes attaching the articulated joint to the hinged frame portion, and rotating the hinged frame portion with respect to the fixed frame portion to provide access clearance for inserting the impeller shaft. In a refinement to this embodiment, the method further includes attaching a lift assist spring between the hinged frame portion and the fixed frame portion, to provide spring force assist during the rotating the hinged frame portion step.

The present disclosure teaches a system for converting a bottom-mix mixing vessel, which is configured for a bottom-mix single-use liner, into a top-mix mixer, where the mixing vessel has a magnetic drive port at a lower portion thereof for engaging a magnetic drive unit, and where the magnetic drive unit has been altered so that no portion of it extends into the interior of the mixing vessel. The system includes a support frame that is attached to an upper portion of the mixing vessel, and has a first component of an articulated joint attached to it, and a motor drive assembly with a rotary output that has a hub lock assembly disposed thereabout, and has a second component of an articulated joint attached to it. The first component is joined with the second component to form an articulated joint that supports the motor drive assembly from the support frame. A top-mix single-use liner is inserted into the mixing vessel, and a rotary hub seal located at an upper portion thereof, and which has an impeller inside. An impeller shaft is inserted through the rotary hub seal and connected to the impeller, and the other end is connected to the rotary output of the motor drive assembly. The rotary hub seal is engaged with the hub lock assembly, thereby enabling the coupling of rotary power from the motor drive assembly, through the rotary hub seal, and to the impeller.

In a specific embodiment of the foregoing system, the articulated joint is adjustable so as to position the impeller at a preferred mixing position within the top-mix single-use liner. In a refinement to this embodiment, the first and second components of the articulated joint are a ball and socket with a position lock that operates to to lock the articulated joint at a preferred position.

In a specific embodiment, the foregoing system further includes a frame adapter that is inserted between the upper portion of the top-mix mixing vessel and the support frame, to thereby adapt the support frame to fit the top-mix mixing vessel.

In a specific embodiment, the foregoing system further includes a motor drive support bracket that is inserted between the second component of the articulated joint and the motor drive assembly, to position, locate and provide clearance for the motor drive assembly with respect to the upper portion of the top-mix mixing-vessel.

In a specific embodiment, the foregoing system further includes a means for lateral adjustment located between the articulated joint and the support frame, for adjustment of position and clearance of the motor drive assembly with respect to the upper portion of the top-mix mixing-vessel. In a refinement to this embodiment, the means for lateral adjustment are plural slots and attachment bolts disposed between the first component of the articulated joint and the support frame.

In a specific embodiment of the foregoing system, the support frame includes a hinged frame portion and a fixed frame portion. The articulated joint is attached to the hinged frame portion, and the hinged frame portion is rotated with respect to the fixed frame portion, to provide access clearance for inserting of the impeller shaft. In a refinement to this embodiment, the system further includes a lift assist spring coupled between the hinged frame portion and the fixed frame portion, to provide spring force assist as the hinge frame portion is rotated with respect to the fixed frame portion.

DESCRIPTION OF THE INVENTION

Figure 1:
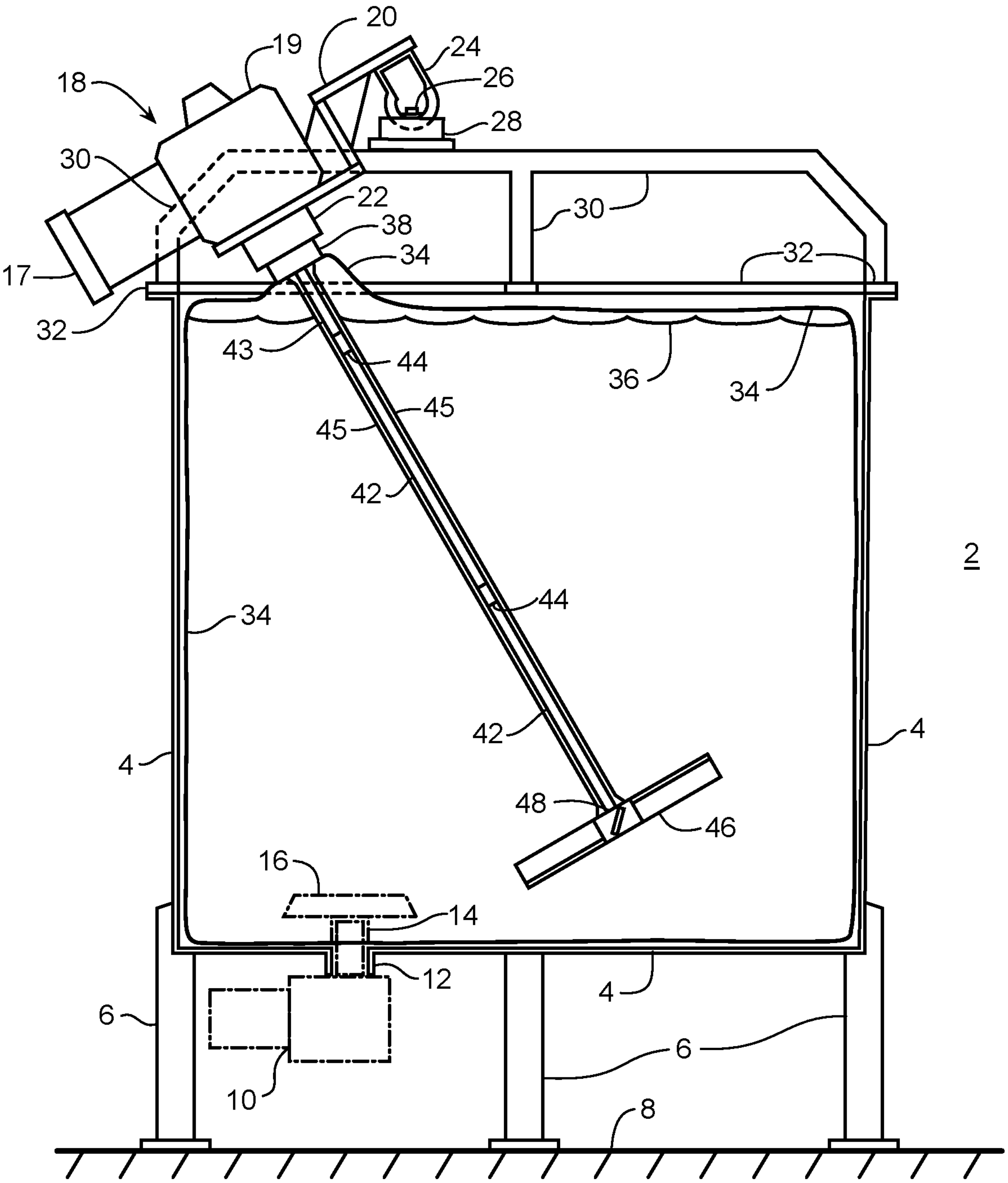
FIG. 1 is a section view drawing of a bottom-mix missing vessel converted to top-mix according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof, and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components, and method steps, have been represented where appropriate by conventional symbols in the drawings, showing only those specific details that are pertinent to understanding the present teachings so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

In a production environment where bottom-mix mixing vessels are in place, but where bottom-mix single-use liners are unavailable, the teaching of the present disclosure enables operators to adapt such mixing vessels to be operated as top-mix mixers that employ top-mix single-use liners, thusly enabling continued production operations in the face of supply chain logistics challenges that would otherwise interrupt production altogether. In fact, production operations can be readily transitioned between top-mix and bottom-mix operations as supply chain logistic dictate, thereby greatly increasing production capacity of critical biopharmaceutical materials.

By way of introduction, a bottom-mix mixer is one where a magnetic drive unit is located adjacent a lower portion of the mixing vessel, and is coupled through a magnetic drive port in the vessel wall to an impeller located inside a bottom-mix single-use liner disposed within the vessel. The coupling is achieved by locating a rotating magnetic drive head of the magnetic drive unit into the magnetic drive port such that it couples rotary power to a magnetic rotor fixed to the impeller. The boundary between the non-sterile magnetic drive head and the sterile magnetic rotor unit is a cup-like fitment in a sterile single-use bag liner, which has been positioned within a magnetic drive port in the mixing vessel. A top-mix mixer is one where a motor drive assembly is located above the mixing vessel with an impeller shaft that passes into a top-mix single-use liner to engage a sterile impeller therein. The sterile passage of the impeller shaft into the top-mix single-use liner is achieved using a rotary hub seal that is fabricated with the top-mix single-use liner. The rotary hub seal has an internal impeller shaft sheath that extends inwardly therefrom, and surrounds the shaft all the way down to an impeller. The sheath rotates together with the shaft and impeller, so that the sterile rotary seal of the rotary hub is located above the liquid level. The impeller shaft must be sufficiently rigid to support the dynamics of impeller operation, and this dictates that a support frame for the motor drive assembly that drives the impeller shaft also be sufficiently rigid for the dynamic loads involved, as will be appreciated by those skilled in the art.

With respect to single-use lined mixers suitable for biopharmaceutical applications, mixing vessels generally range from approximately one-hundred to three thousand liters in volume. Impellers are operated from zero to one thousand RPM. The mixer vessels are fabricated from various grades of stainless steel and rigid polymers. The single-use liners are fabricated from flexible polymeric films, which are sometimes medical grade ULDPE in contact with the sterile fluid. The films may also be coextruded to provide strength, flexibility, gas barrier performance and inert contact. Gas barriers may be polyethylene vinyl alcohol polymers (EVOH). The outer layer may be made from ethylene vinyl acetate (EVA), ULDPE, and low density polyethylene (LDPE). Each liner may include plural fitments for attaching fill and drain conduits, sensory ports, sampling ports, lifting bosses, magnetic drive cups, rotary hub seals, and other fitments, as are known to those skilled in the art. Since the mixing impeller necessarily contacts the production fluids that are to be mixed, these are generally manufactured into the single-use liner, whether it is for top-mix or bottom mix applications.

Generally speaking, the advantages of employing single-use liners, as opposed to clean-in-place/sterilize-in-place (CIP/SIP) operating techniques, are many. These includes decreased contamination risk, reduced cleaning downtime, quality and regulatory compliance, reduced operator exposure risks, increased production capacity in multi-product facilities, ease of setup and utilization, and enclosed, sterile sampling, among other benefits.

Reference is directed to FIG. 1, which is a section view drawing of a bottom-mix mixing vessel converted to a top-mix mixing vessel 2 according to an illustrative embodiment of the present invention. In this embodiment, a stainless steel mixing vessel 4 is provided, which is supported from a floor 8 with plural legs 6. A bottom-mix magnetic drive port 12 is formed through the bottom of the vessel 4. The bottom-mix magnetic drive unit 10 and bottom-mix impeller 16, as well as the magnetic coupling components 14 therebetween, are illustrated in phantom line since they have been removed from the vessel 4 prior to conversion to top-mix operation, as illustrated. For this conversion, any components of the magnetic drive that extend into the interior of the vessel 4 are removed, since they may interfere with, or damage, the top-mix single-use liner 34 that is inserted into the vessel 4 for top-mix operation. In some applications, the magnetic drive unit 10 may remain in place so that either bottom-mix or top-mix operation are possible, as supply chain logistics allow and/or dictate.

The top-mix single-use liner 34 is inserted into the vessel 4, and presents a rotary hub seal 38 that is formed continuous with the film portion of the liner 34, to thereby maintain a sterile environment within the liner 34. A film sheath 45 extends from the hub seal 38 into the interior of the liner 34, and continuously to a mixing impeller 46, all of which are formed into and remain sterile within the liner 34. During installation, an impeller shaft 42 is inserted through the rotary hub seal 38, down into the sheath 45, and engages 48 the impeller 46 such that rotation of the impeller shaft 42 also rotates the impeller 46. In this embodiment, the impeller shaft 42 is provided with plural segments that are joined with couplers 44 as the shaft 42 is gradually inserted into the sheath 45. During operation, the production fluids are filled, through various ports (not illustrated in FIG. 1), to a fill level 36, as illustrated.

In FIG. 1, the conversion from bottom-mix to top-mix operation requires a suitable support for the motor drive assembly 18, since the static and dynamic loads of mixer operation are borne by the combination of the impeller shaft 42, the motor drive assembly 18 and the various mounting components. It should be noted that a mixing vessel originally provided for bottom-mix operation will not have the requisite structure to address these mounting and loading requirements. This limitation is overcome under the teachings of the present disclosure through the use of a support frame 30. This frame 30 attaches to an upper portion of the vessel 4, typically the upper rim of the vessel 4. The use of a frame adapter 32 is advantageous since it allows a single support frame 30 design to be adapted to plural vessel designs of similar size. Having a support frame 30 in place on the vessel 34, it is then possible to mount the motor drive assembly 18 and couple the impeller shaft 42 to the motor drive assembly's rotary output 43. In this embodiment, the rotary output is a stub-shaft 43 joined to the impeller shaft 42 by a coupler 44, as illustrated. In other embodiments, the impeller shaft may be inserted into a rotary drive socket (not illustrated) in the motor drive unit.

Since the top-mix configuration in FIG. 1 is a retrofit apparatus, the issue of impeller 46 position and alignment within the liner 34 and vessel 4 must be addressed. Firstly, the impeller 4 must be located at a position where it will not impact upon the top-mix single-use liner 34 because such impact may damage or tear the liner, violating the otherwise sterile environment therein. Secondly, the impeller should be located at a position that provides optimum mixing of the production fluids 36, as will be appreciated by those skilled in the art. This alignment is accomplished through selection of the impeller shaft 42 length in combination with an articulated mounting joint 24, 26, 28, as well as other alignment components, which will be more fully discussed hereinafter.

In the illustrative embodiment of FIG. 1, an articulated joint is in the form of a ball and socket joint comprising a socket cup 28, a ball mount 24, and a locking bolt set 26, as illustrated. This enables full rotation adjustment in azimuth as well as tilt/yaw, to the extent that various components of the system do not interfere with such movement. The socket cup 28 is fixed to the support frame 30, and a motor support bracket 20 is fixed to the ball mount 24. The motor drive assembly 18 is further fixed to the motor support bracket 20, such that adjustment to the cup 28 and ball 24 direct the angle at which the impeller shaft 42 is oriented. In addition, the motor support bracket 20 can be fabricated with offsets to the mounting surfaces that adjust the position and clearance of the motor drive assembly with respect to the surrounding structures. Once a suitable orientation is obtained, the locking bolt set 26 is tightened to secure that orientation during operation.

The motor drive assembly 18 in FIG. 1 is comprised of plural sub-components. These include an electric motor 17 and a gear reduction drive 19, which provides the rotary output 43 that the impeller shaft 42 is connected to. In addition, the motor drive assembly 18 is coupled to the motor support bracket 20 and a hub lock assembly 22. The hub lock assembly 22 selectively engages the rotary hub seal 38 of the liner 34. This arrangement is designed for this function, such that the hub lock 22 is opened, the rotary hub seal 38 is partially inserted thereinto, and the hub lock is then closed to retain the hub seal 38, as well as the liner 34 itself, in place.

Figure 2:
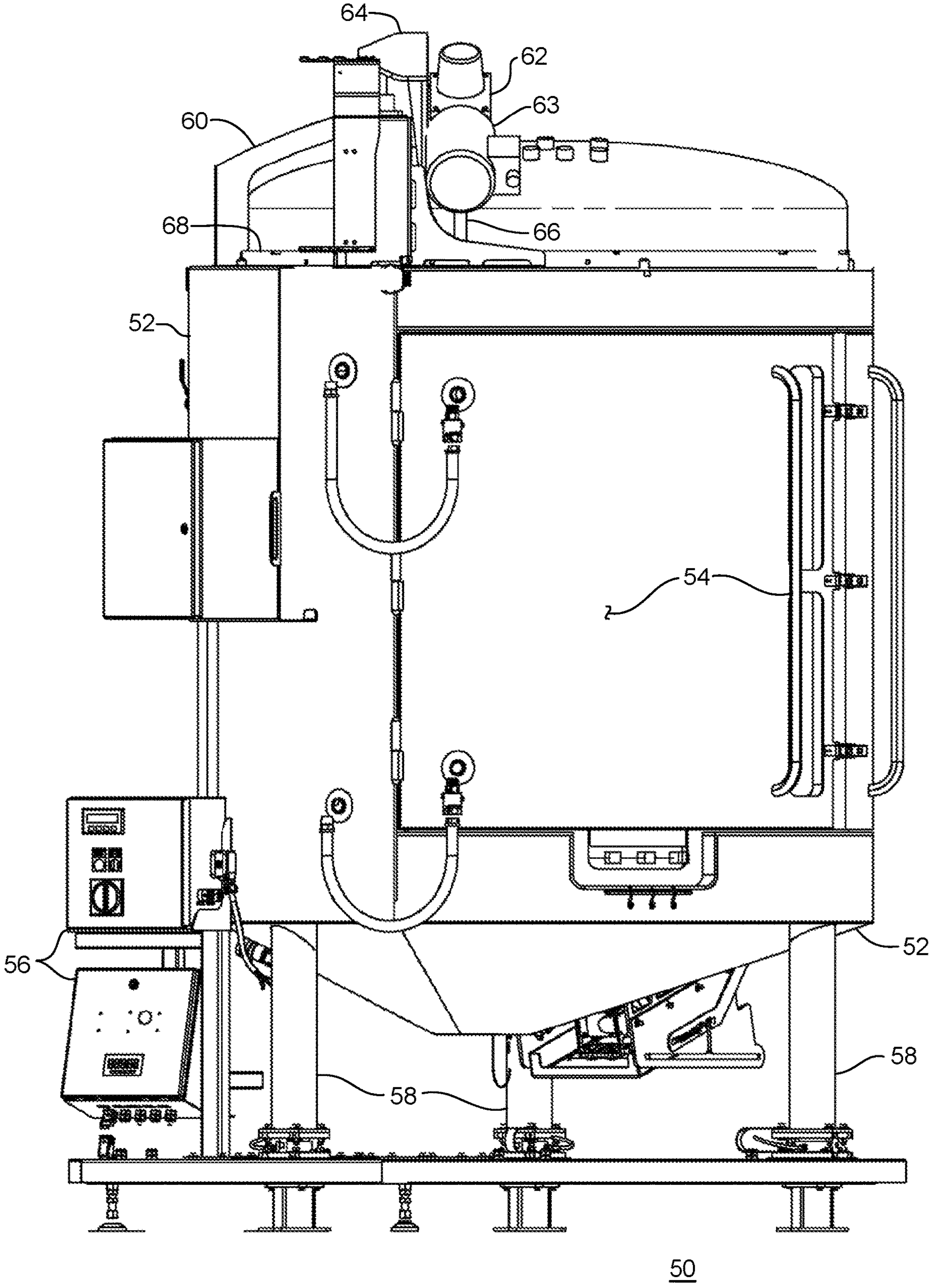
FIG. 2 is an end view drawing of a mixing vessel converted for top-mix operation according to an illustrative embodiment of the present invention.
Figure 3:
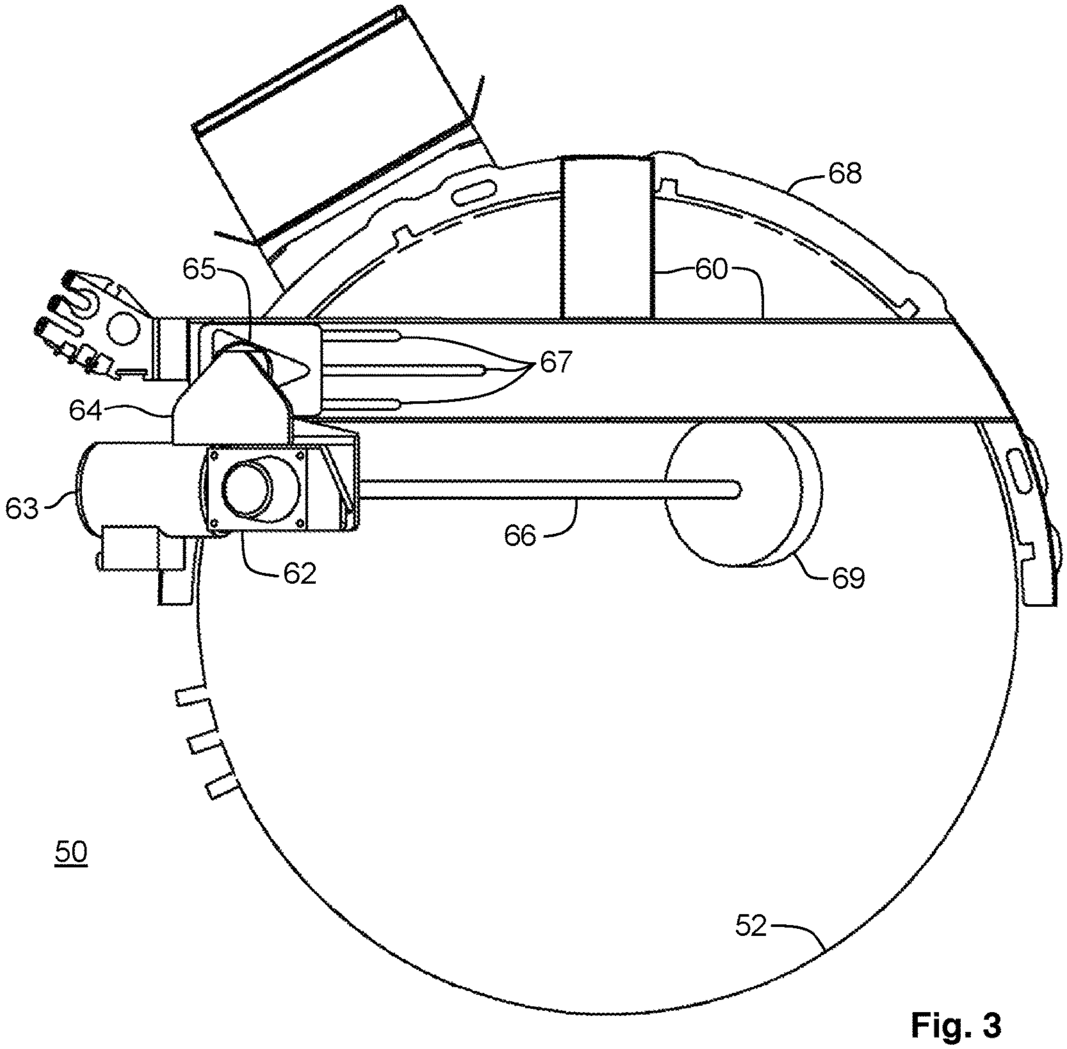
FIG. 3 is a top view drawing of a mixing vessel converted for top-mix operation according to an illustrative embodiment of the present invention.

Reference is directed to FIG. 2 and FIG. 3, which are an end view drawing and a top view drawing, respectively, of a mixing vessel assembly 50 converted for top-mix operation according to an illustrative embodiment of the present invention. This embodiment illustrates a more complex assembly, typical of a real-world production application. The mixing vessel 52 is supported on plural legs 58, and includes certain electrical and fluid control panels 56. An access door 54 is provided for insertion and removal of a single-use liner (not illustrated), and may include other fitments such as thermal insulation and heating/cooling jackets. A support frame 60 of the illustrative embodiment is fitted to an upper portion of the vessel 52. A frame adapter 68 is provided between the vessel 52 and the support fame 60 to facilitate convenient connection and adaptation therebetween. An articulated joint 65 is connected to the support frame 60 along a slotted 67 connection, which provides an additional degree of lateral movement between the motor drive assembly 62, 63 and the vessel 52. This further facilitates a solution to the aforementioned alignment issues involved in such a retrofit installation. A motor drive support bracket 64 is located between the articulated joint 65 and the gear reduction drive 62, that is further connected to an electric motor 63. An impeller shaft 66 extends into the vessel 52 to the impeller 69 located therein.

Figure 4:
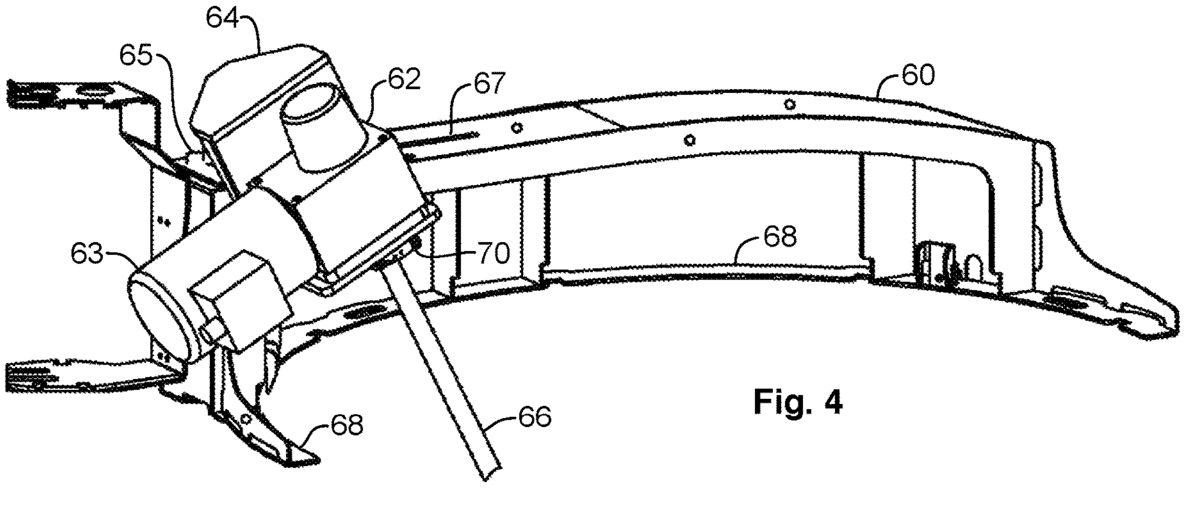
FIG. 4 is a perspective view drawing of a top-mix conversion assembly according to an illustrative embodiment of the present invention.
Figure 5:
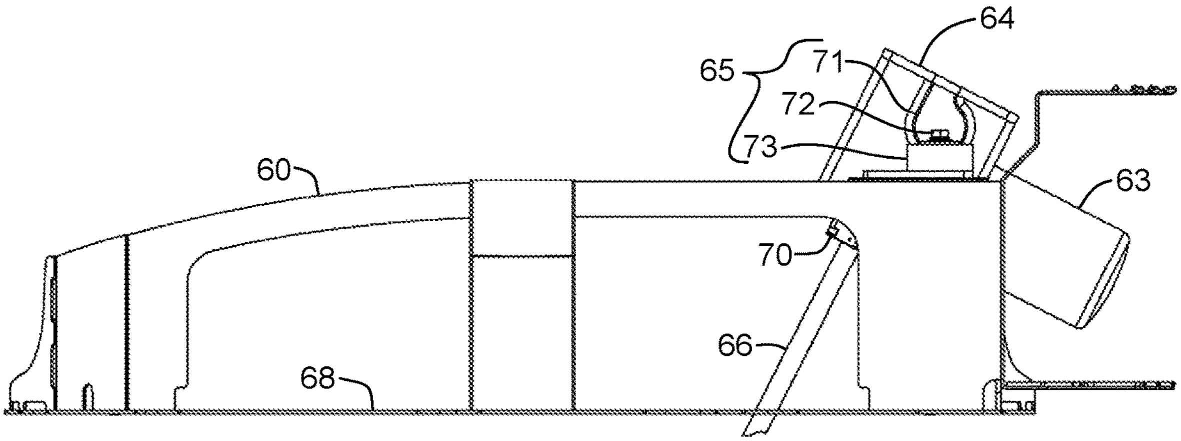
FIG. 5 is a side view drawing of a top-mix conversation assembly according to an illustrative embodiment of the present invention.

Reference is directed to FIG. 4 and FIG. 5, which are a perspective view drawing and a side view drawing, respectively, of a top-mix conversion assembly according to an illustrative embodiment of the present invention. FIGS. 4 and 5 correspond to FIGS. 2 and 3. The support frame 60 and frame adapter 68 are illustrated. The articulated joint 65 is attached to the support frame 60 along plural slots 67, which facilitate lateral position adjustment of the motor drive assembly 63, 64. The articulated joint consists of a socket member 73 attached to the support frame 60, a ball member 71 attached the motor support bracket 64, and a locking bolt set 72 that is tightened to fix the position of the articulated mount 75. The motor drive assembly consists of the an electric motor 63, a gear reduction drive 62, and a hub lock assembly 70, as discussed hereinbefore. Various other fitments may be attached to provide other functions not germane to the present disclosure.

Figure 6:
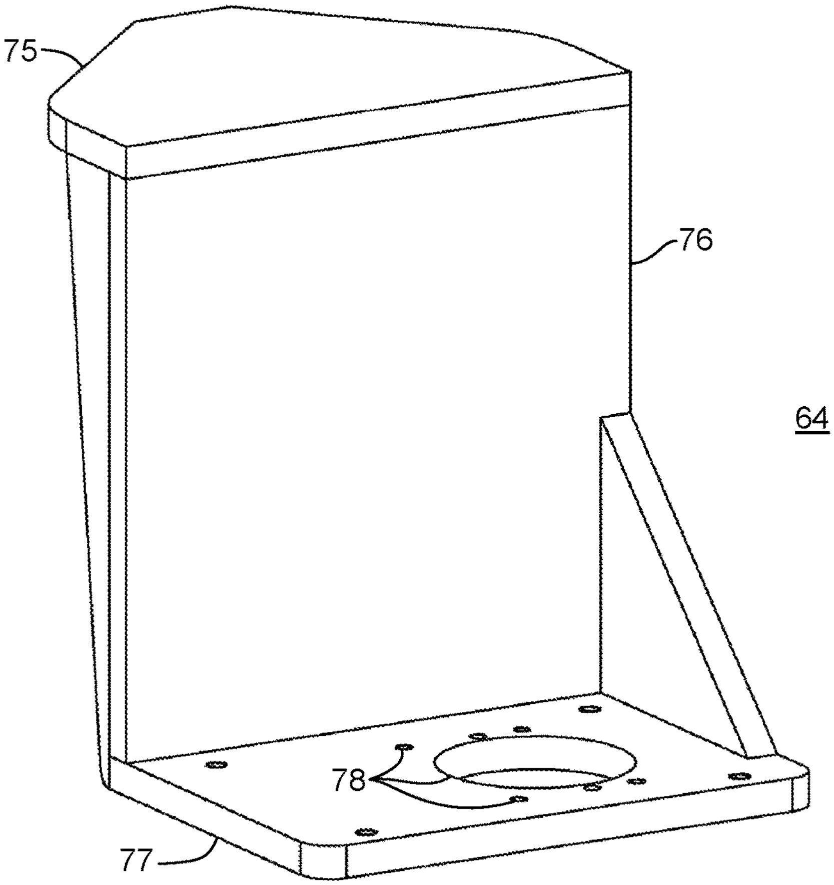
FIG. 6 is a perspective view drawing of a motor drive mounting bracket according to an illustrative embodiment of the present invention.

Reference is directed to FIG. 6, which is a perspective view drawing of a motor drive support bracket 64 according to an illustrative embodiment of the present invention. FIG. 6 corresponds with FIGS. 2, 3, 4, and 5. In FIG. 6, the motor drive support bracket 64 consist of the motor drive mounting plate 77, which is drilled and adapted to attach the gear reduction drive (item 62 in FIG. 4), and an articulated mount mounting plate 75 that are spaced apart by a vertical plate 76. That assembly its gusseted, as illustrated, to provide sufficient strength and rigidity, as will be appreciated by those skilled in the art. The physical shape and size of the bracket can be adapted to suit various installation requirements, as will be appreciated by those skilled in the art.

Figure 7:
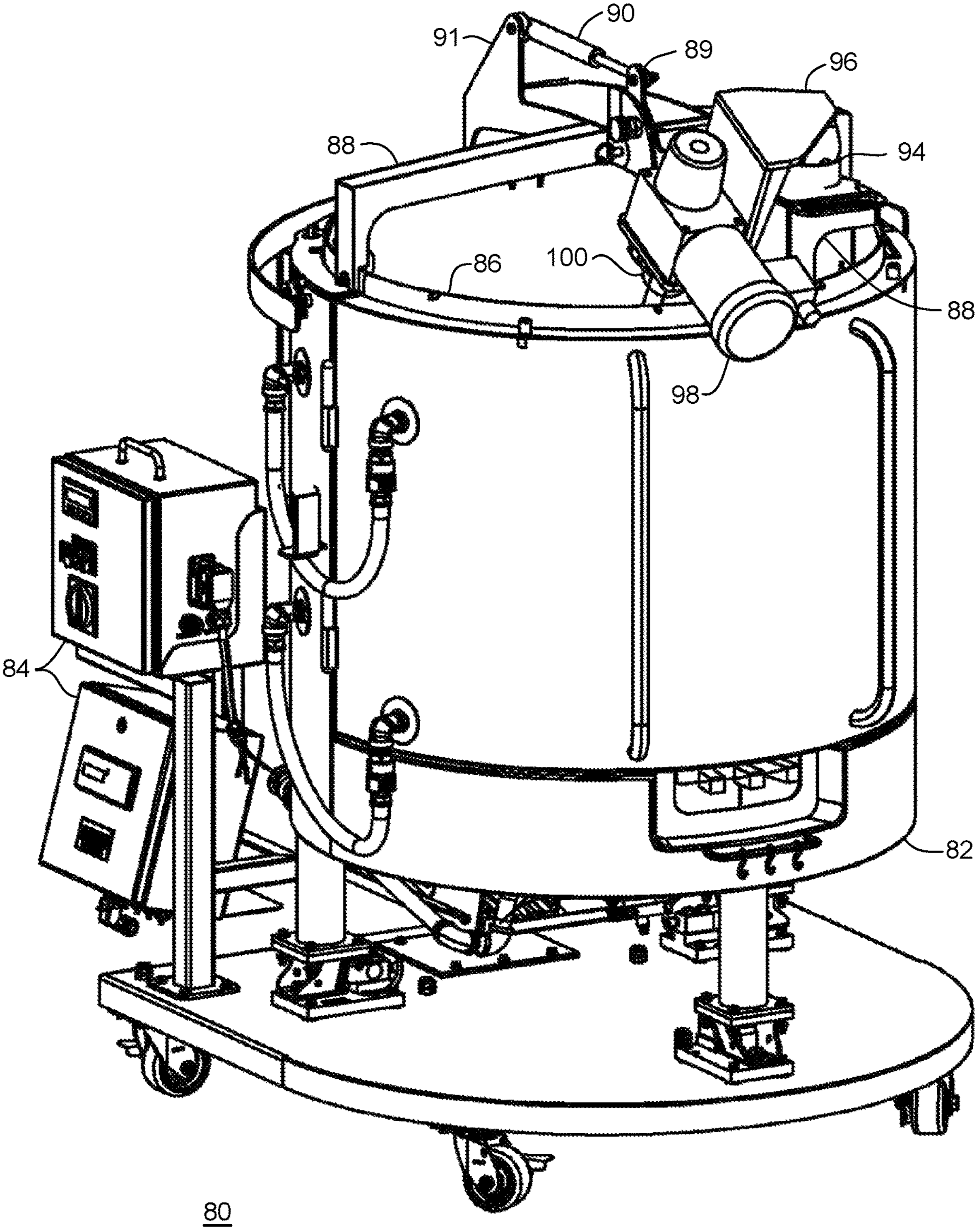
FIG. 7 is a perspective view drawing of a mixing vessel converted for top-mix operation according to an illustrative embodiment of the present invention.
Figure 8:
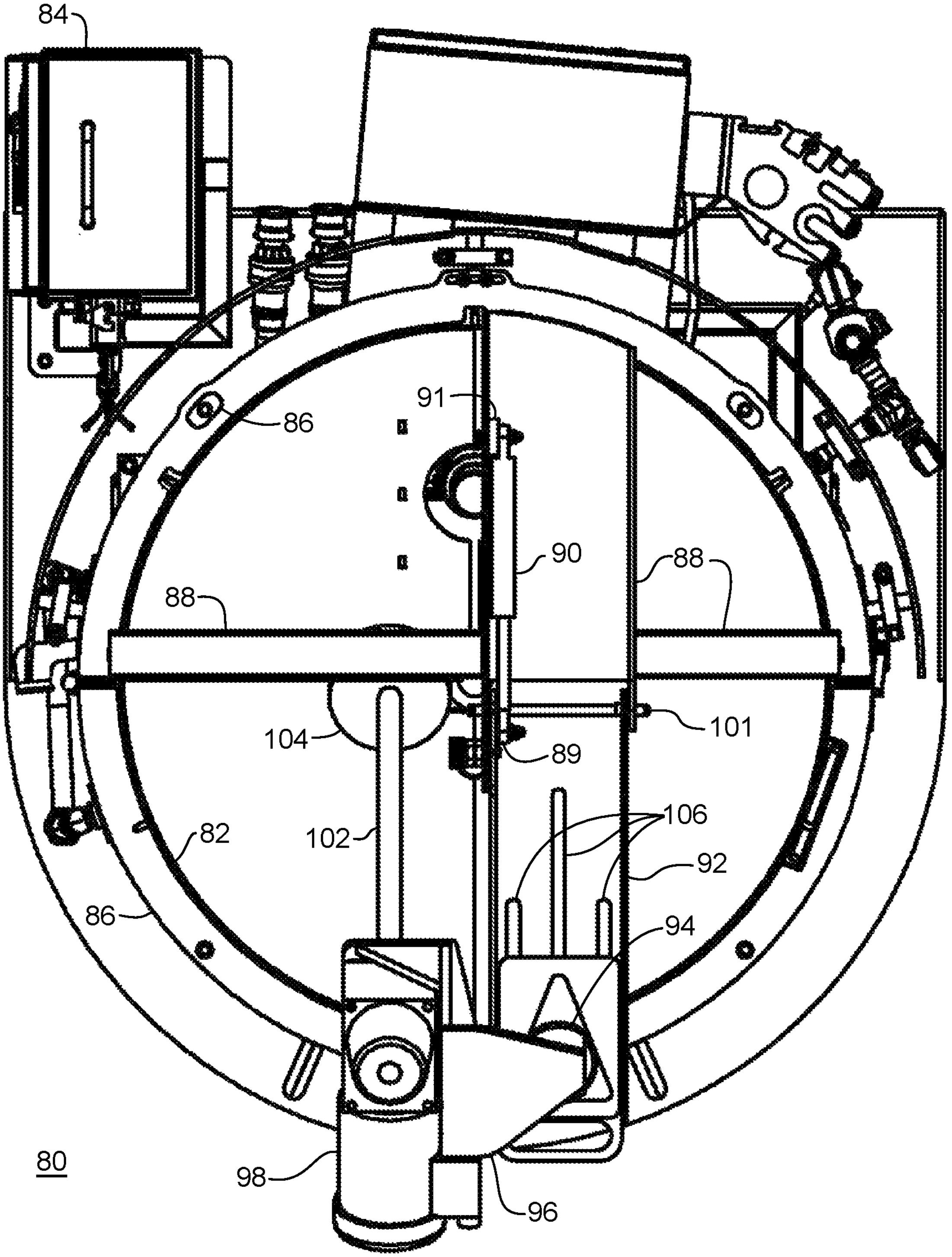
FIG. 8 is a top view drawing of a mixing vessel converted for top-mix operation according to an illustrative embodiment of the present invention.
Figure 9:
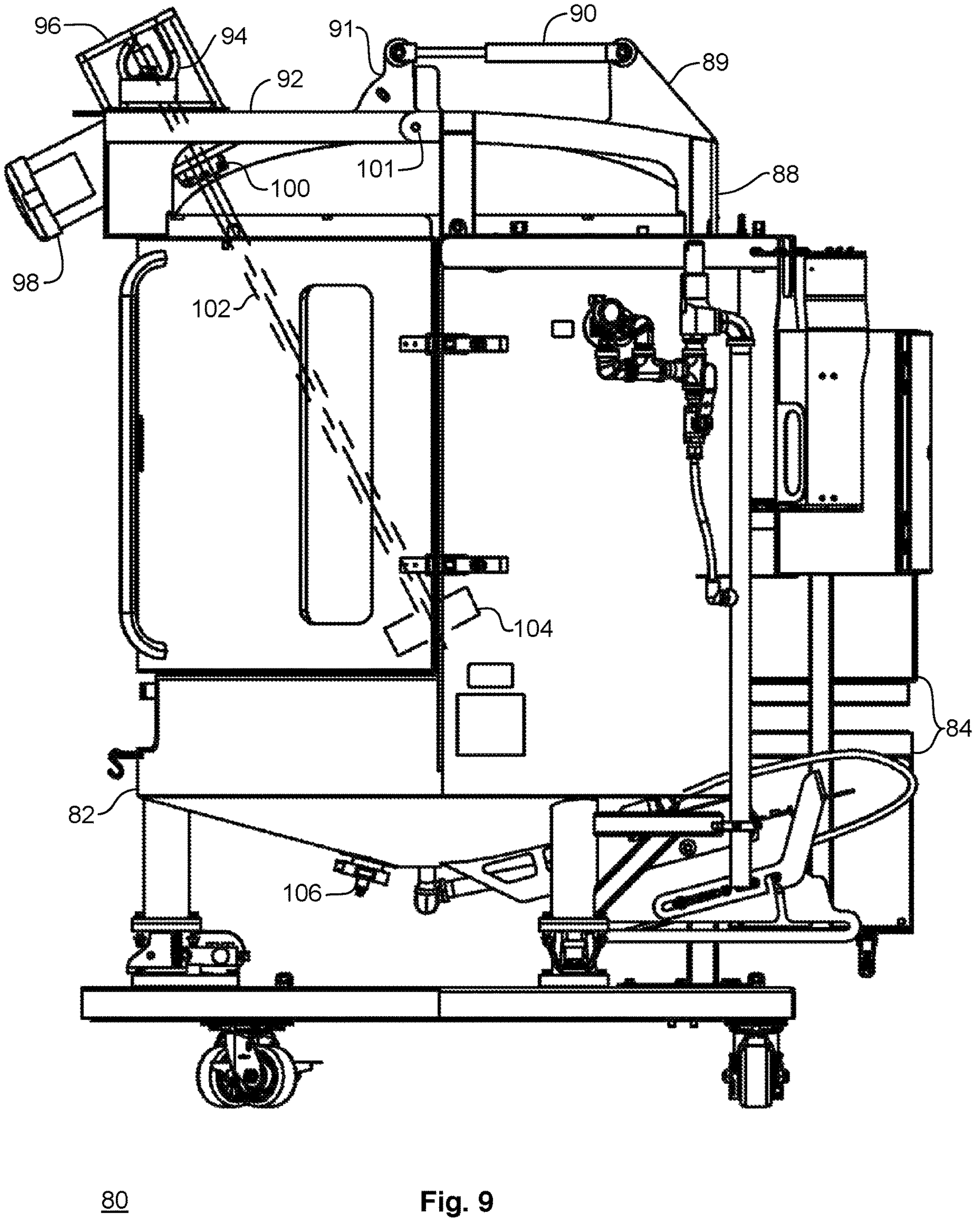
FIG. 9 is a side view drawing of a mixing vessel converted for top-mix operation according to an illustrative embodiment of the present invention.

Reference is directed to FIG. 7, FIG. 8, and FIG. 9, which are a perspective view drawing, a top view drawing, and a side view drawing, respectively, of a mixing vessel assembly 80 converted for top-mix operation according to an illustrative embodiment of the present invention. This embodiment is useful in a smaller sized mixing vessel, or one that does not include a side door for inserting a single-use liner. In such a vessel, the liner must be inserted from the top, and sometimes the additional support frame 88, 92 obstructs access to do so. This issue is mitigated by separating the frame with a hinge 101 such that a hinged frame portion 92 and a fixed frame portion 88 cooperate in that the hinged frame portion 92 can be swung up and away to provide greater clearance. In addition, once the top-mix conversion have been completed, clearance is needed to install the impeller shaft 102, and the hinged frame portion 92 also facilitates this need.

Now further considering these FIGS. 7, 8, and 9, the mixing vessel 82 and its related support and operational fixtures, including control panels 84 are illustrated. Note that the vessel 82 includes a capped magnetic drive port 106 along its lower conical surface, which is a part of the bottom-mix to top-mix conversion in that the magnetic drive unit (not illustrated) has been removed from the magnetic drive port 106. A fixed support frame portion 82 is attached to the upper rim of the mixing vessel 82 using a frame adapter 86, as similarly described in the prior embodiments. A hinge 101 is disposed between the fixed support frame portion 88 and an hinged support frame portion 92, as illustrated. The fixed frame portion 88 includes an first spring mount extension 91, and the hinged frame portion 92 includes a second spring mount 89, which are positioned and aligned to accept a lift assist spring 90, which is a nitrogen filled spring cartridge as are known to those skilled in the art. Other spring arrangements could also be employed. The lift assist spring 90 acts to reduce the force needed to rotate the hinged frame portion 92 between a closed portion used for mixing operations and an open position for clearance access.

The hinged frame portion 92 supports an articulated joint 94, which is a cup and ball arrangement as described hereinbefore. The articulated joint 94 is attached to the hinged frame portion 92 along a means for lateral adjustment 106, which is plural slots formed in the hinged frame portion 92 and accompanying bolt sets (not illustrated), to facilitate lateral position adjustment of the articulated joint 94 along the hinged frame portion 92, as illustrated. A motor drive bracket 96 is attached to the upper half of the articulated joint 94, and is configured to relocated the motor drive assembly 98 to a position of favorable clearance thereof with respect to the various surrounding structures. The motor drive assembly 98 includes a hub lock assembly 100 that engages the top-mix single-use liner (not illustrated) rotary hub seal (not illustrated) to retain the liner and seal in place, as described hereinbefore. An impeller shaft 102 extends from the motor drive assembly 98 into the vessel 82, which drives the impeller 104, in like manner as the prior embodiments.

Figure 10:
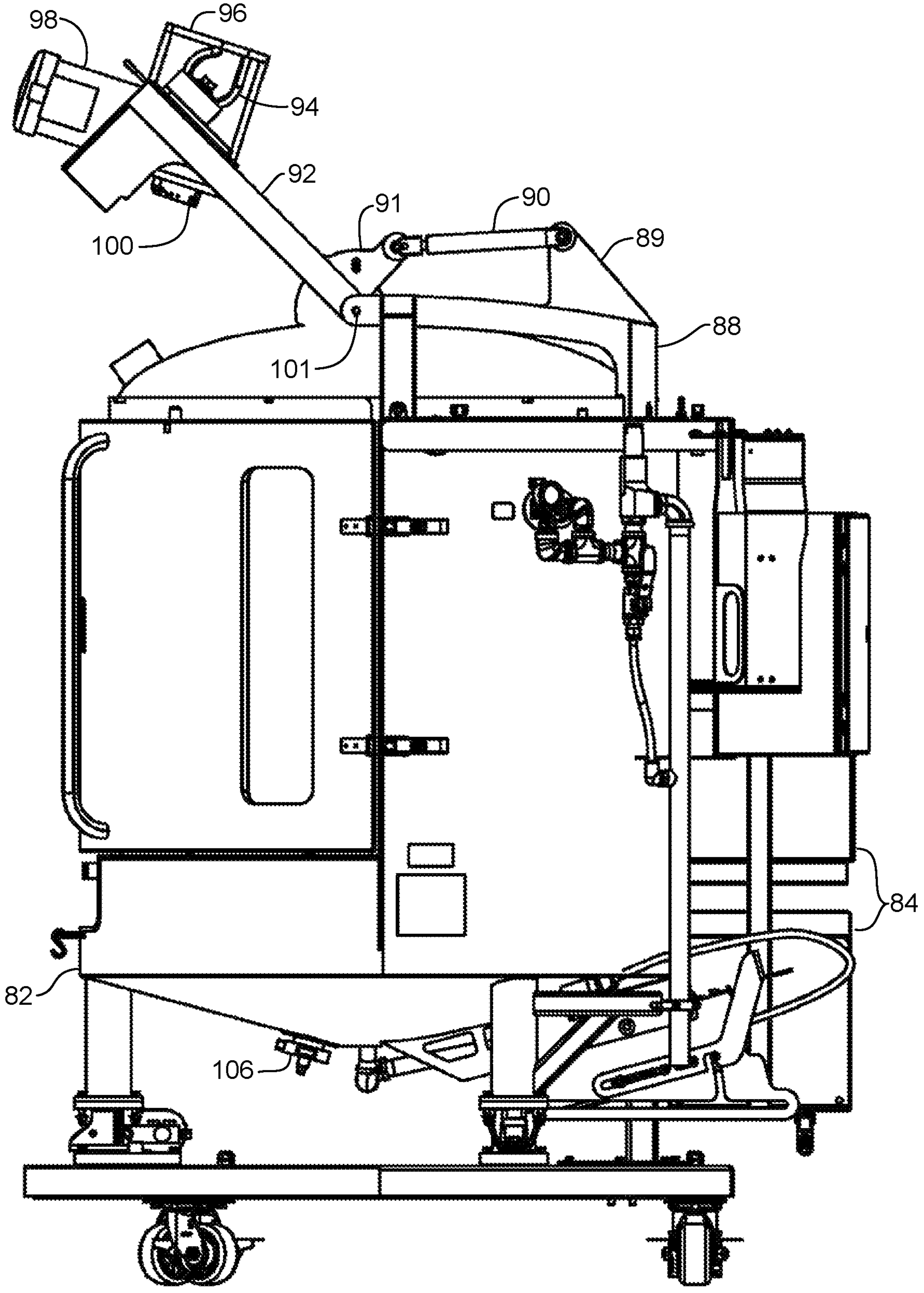
FIG. 10 is a side view drawing of a mixing vessel converted for top-mix operation according to an illustrative embodiment of the present invention.

Reference is directed to FIG. 10, which is a side view drawing of a mixing vessel 82 converted for top-mix operation according to an illustrative embodiment of the present invention. FIG. 10 corresponds with FIGS. 7, 8, and 9. In FIG. 10, the hinged frame portion 92 is illustrated in the open position, which provides additional clearance for insertion of the top-mix single-use liner (not illustrated) and attachment of the impeller shaft (not illustrated). In the open position, the lift asset spring 90 is in its retracted position, closing the distance between the first spring mount extension 91, and the second spring mount 89, which lifts the hinged frame portion 92, as illustrated. This lifting action also lifts the articulate joint 94, the motor drive support bracket 96, and the motor drive 98, which provides convenient access to the rotary output and hub lock assembly 100 of the motor drive assembly 98.

Figure 11:
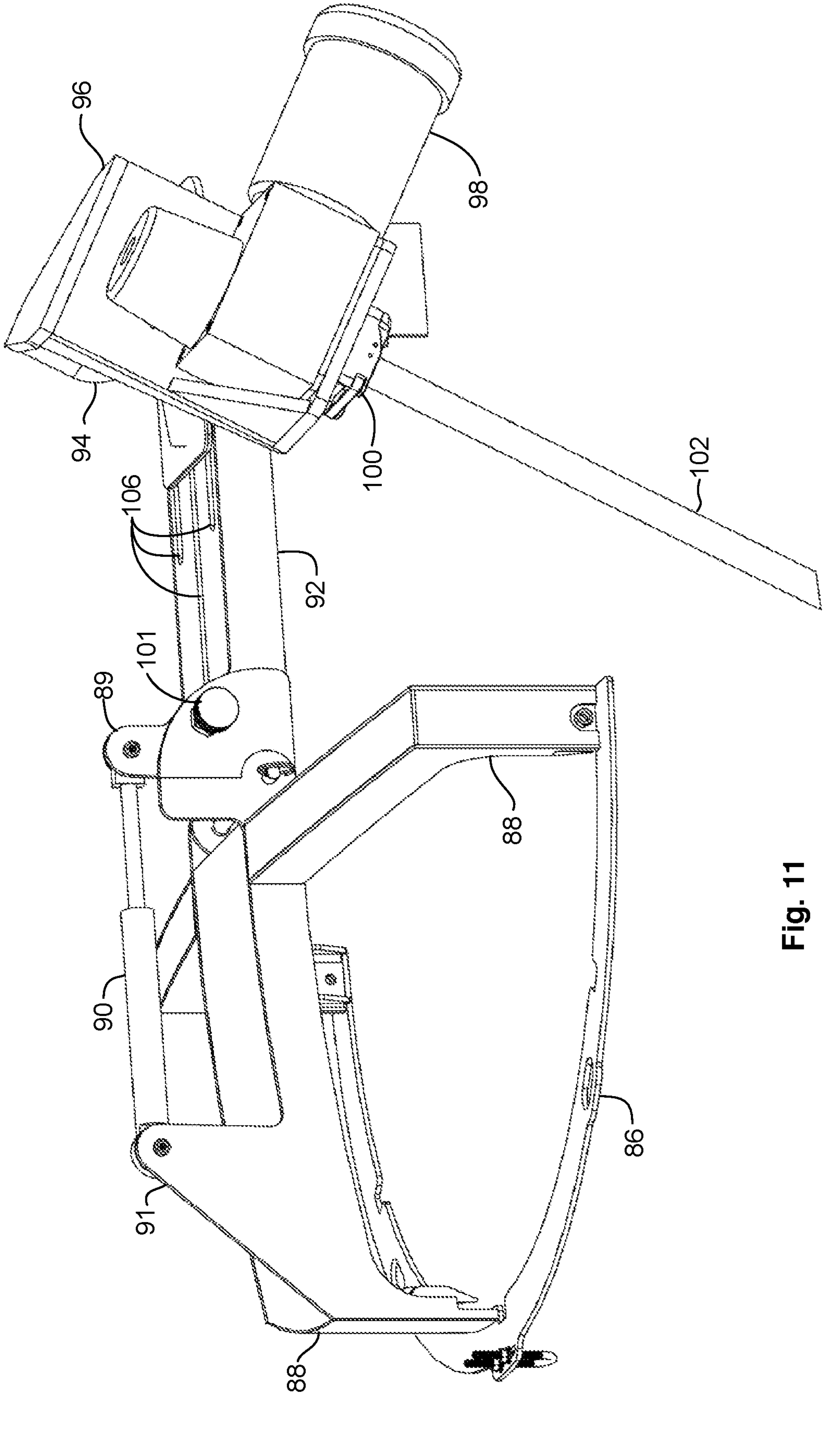
FIG. 11 is a perspective view drawing of a top-mix conversion assembly according to an illustrative embodiment of the present invention.

Reference is directed to FIG. 11, which is a perspective view drawing of a top-mix conversion assembly according to an illustrative embodiment of the present invention. FIG. 11 corresponds with FIGS. 7, 8, 9, and 10. FIG. 11 illustrates the various components of the retrofit support frame and its related components. These include the fixed frame portion 88 that is attached to an upper portion of the host mixing vessel (not illustrated) using a frame adapter 86. The hinge 101 rotatably engages the hinged frame portion 92. The fixed frame portion 88 includes a first spring mount extension 91, and the hinged frame portion 92 includes a second spring mount 89, which are positioned and aligned to accept a lift assist spring 90. The articulated joint 94 is attached to the hinged frame portion 92 along the lateral slots 106, as described hereinbefore. The motor drive support bracket 96 is disposed between the articulated joint 94 and the motor drive assembly 98. The motor drive assembly 98 includes the hub lock assembly 100, and also couples to the impeller drive shaft 102.

Figure 12:
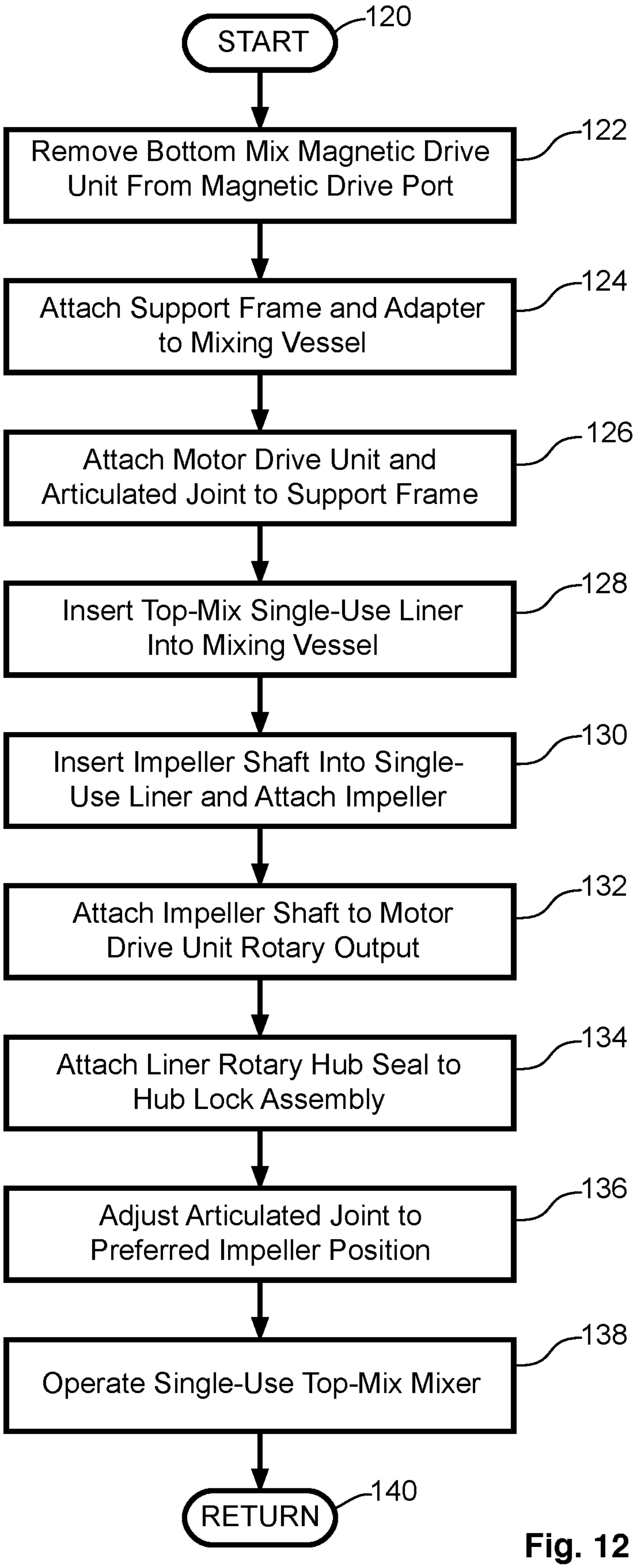
FIG. 12 is a bottom-mix to top-mix conversion process according to an illustrative embodiment of the present invention.

Reference is directed to FIG. 12, which is a bottom-mix to top-mix conversion process diagram according to an illustrative embodiment of the present invention. The process begins at step 120 and proceeds to step 122 where the bottom mix magnetic drive unit is cleared from then magnetic drive port on the host mixing vessel. At step 124, the support frame and frame adapter are connected to an upper portion of the host mixing vessel. At step 126, the articulated joint and motor drive assembly are attached to the support frame. At step 128, a top-mix single-use liner is inserted into the host mixing vessel. At step 130, the impeller shaft is inserted into the liner and coupled to the impeller therein. At step 132, the impeller shaft is coupled to the rotary output of the motor drive assembly. At step 134, the rotary hub seal of the liner is coupled to the hub lock assembly of the motor drive assembly. At step 136, the articulated joint is adjusted to locate the impeller it a preferred position. And, at step 138 mixing operations are commenced. The process returns at step 140.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A method of converting a bottom-mix mixing vessel, having a magnetic drive unit that engages a magnetic drive port formed though a lower portion of the mixing vessel and which is configured to receive a bottom-mix single-use liner therein, to top-mix operation, comprising the steps of:

configuring the magnetic drive unit such that no portion of the magnetic drive unit extends into the interior of the mixing vessel;

attaching a support frame, having a first component of an articulated joint attached to the support frame, to an upper portion of the mixing vessel;

attaching a motor drive assembly, having a second component of an articulated joint fixed to the motor drive unit, to the support frame by engaging the first component with the second component, thereby assembling an articulated joint and supporting the motor drive assembly;

inserting a top-mix single-use liner, having a rotary hub seal about an upper portion of the top-mix single-use liner, into the mixing vessel;

inserting an impeller shaft through the rotary hub seal and engaging a distal end of the impeller shaft to an impeller located inside the top-mix single-use liner;

coupling a proximal end of the impeller shaft with a rotary output of the motor drive assembly, passing the impeller shaft through a hub lock assembly attached to the motor drive assembly, and engaging the rotary hub seal with the hub lock assembly, thereby enabling the coupling of rotary power from the motor drive assembly, through the rotary hub seal, and to the impeller.

2. The method of claim 1, and further comprising the step of:

adjusting the articulated joint to align the impeller shaft so as to position the impeller at a preferred mixing position within the top-mix single-use liner.

3. The method of claim 2, wherein the first and second components of the articulated joint are either of a ball member and a socket member, and having a position lock disposed therebetween, and further comprising the step of:

locking the position lock after said adjusting the articulated joint step.

4. The method of claim 1, and further comprising the step of:

inserting a frame adapter between the upper portion of the top-mix mixing vessel and the support frame, thereby adapting the support frame to fit the top-mix mixing vessel.

5. The method of claim 1, and further comprising the step of:

inserting a motor drive support bracket between the second component of the articulated joint and motor drive assembly, thereby adjusting the position and clearance of the motor drive assembly with respect to the upper portion of the top-mix mixing-vessel.

6. The method of claim 1, further comprising the step of:

inserting a means for lateral adjustment between the articulated joint and support frame, and adjusting the means for lateral adjustment for position and clearance of the motor drive assembly with respect to the upper portion of the top-mix mixing-vessel.

7. The method of claim 6, and wherein the means for lateral adjustment are plural slots and attachment bolts disposed between the first component of the articulated joint and the support frame.

8. The method of claim 1, and wherein the support frame includes a hinged frame portion and a fixed frame portion, and further comprising the steps of:

attaching the articulated joint to the hinged frame portion, and rotating the hinged frame portion with respect to the fixed frame portion, thereby providing access clearance for the step of inserting the impeller shaft.

9. The method of claim 8, and further comprising the steps of:

attaching a lift assist spring between the hinged frame portion and the fixed frame portion, thereby providing spring force assist during said rotating the hinged frame portion step.

10. A system for converting a bottom-mix mixing vessel, configured to receive a bottom-mix single-use liner therein, to a top-mix mixer, wherein the mixing vessel is configured with a magnetic drive port formed through a lower portion of the mixing vessel for engaging a magnetic drive unit, and wherein the magnetic drive unit has been altered such that no portion of the magnetic drive unit extends into the interior of the mixing vessel, the system comprising:

a support frame for attachment to an upper portion of the mixing vessel, and having a first component of an articulated joint attached to said support frame;

a motor drive assembly having a rotary output with a hub lock assembly disposed about said rotary output, and having a second component of an articulated joint fixed to said motor drive assembly, wherein said first component is joined with said second component to form an articulated joint that supports said motor drive assembly from said support frame;

a top-mix single-use liner for insertion into the mixing vessel, having a rotary hub seal disposed about an upper portion of said top-mix single-use linter, and having a impeller disposed within said top-mix single-use liner;

an impeller shaft for insertion through said rotary hub seal to engage a distal end of said impeller shaft with said impeller, and a proximal end for connection to said rotary output of said motor drive assembly, and wherein said rotary hub seal is engaged with said hub lock assembly, thereby enabling the coupling of rotary power from the motor drive assembly, through the rotary hub seal, through said impeller shaft, and to the impeller.

11. The system of claim 10, and wherein:

said articulated joint is adjustable to align said impeller shaft to thereby position said impeller at a preferred mixing position within said top-mix single-use liner.

12. The system of claim 11, and wherein:

said first and second components of said articulated joint are either of a ball member and a socket member, having a position lock disposed between said first and second components of said articulated joint, and operable to lock said articulated joint at a preferred position.

13. The system of claim 10, and further comprising:

a frame adapter for insertion between the upper portion of the top-mix mixing vessel and said support frame, to thereby adapt said support frame to fit the top-mix mixing vessel.

14. The system of claim 10, and further comprising:

a motor drive support bracket for insertion between said second component of said articulated joint and said motor drive assembly, to thereby position, locate and provide clearance for said motor drive assembly with respect to the upper portion of the top-mix mixing-vessel.

15. The system of claim 10, further comprising:

a means for lateral adjustment disposed between said articulated joint and said support frame, for adjustment of position and clearance of said motor drive assembly with respect to the upper portion of the top-mix mixing-vessel.

16. The system of claim 15, and wherein:

said means for lateral adjustment are plural slots and attachment bolts disposed between said first component of said articulated joint and said support frame.

17. The system of claim 10, and wherein:

said support frame comprises a hinged frame portion and a fixed frame portion, and wherein said articulated joint is attached to said hinged frame portion, and wherein said hinged frame portion is rotated with respect to said fixed frame portion, to thereby provide access clearance for inserting of said impeller shaft.

18. The system of claim 17, and further comprising:

a lift assist spring coupled between said hinged frame portion and said fixed frame portion, to thereby provide spring force assist as said hinge frame portion is rotated with respect to said fixed frame portion.

* * * * *